Patented Nov. 28, 1950

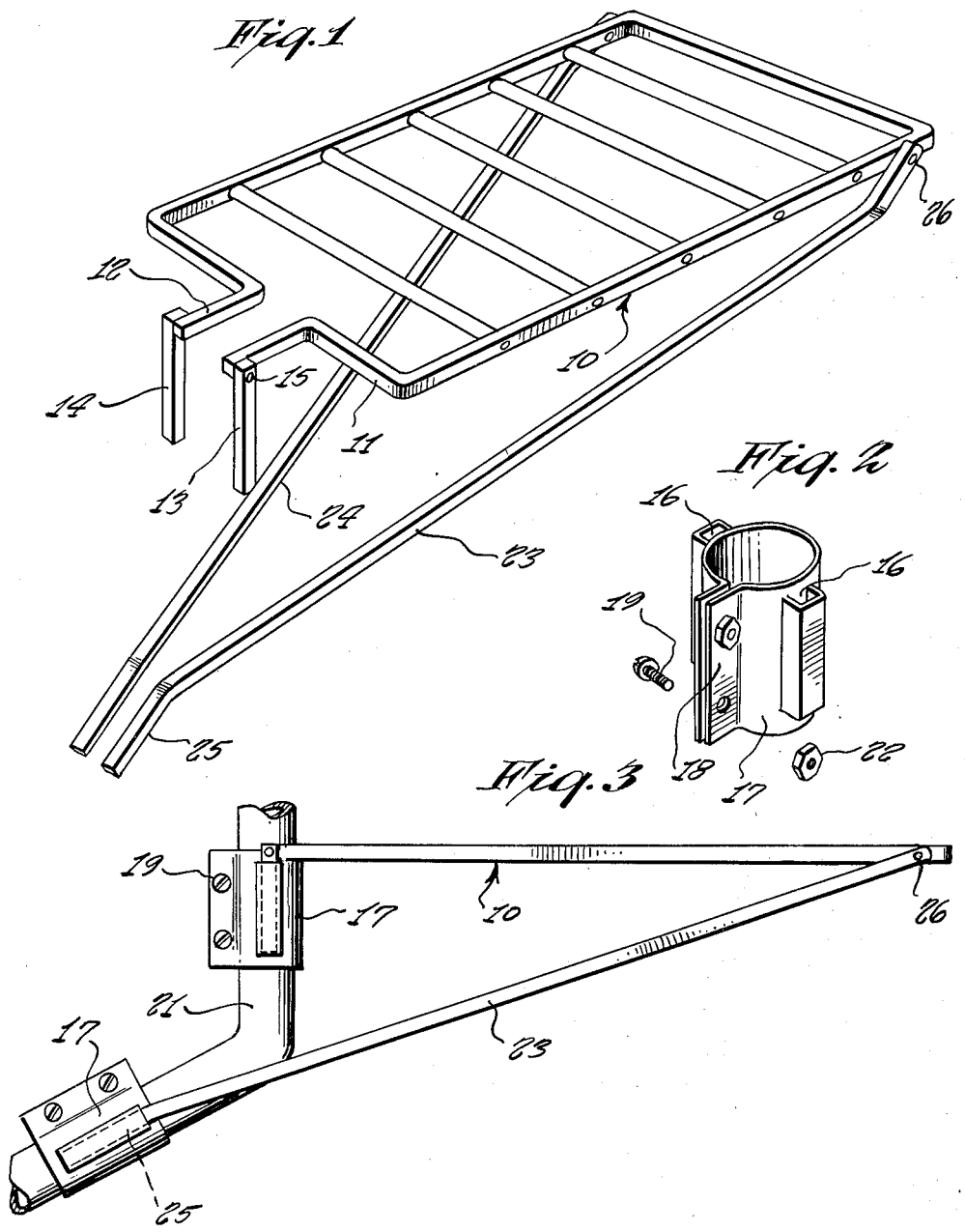

2,531,902

UNITED STATES PATENT OFFICE 2,531,902

DETACHABLE BICYCLE CARRIER-
UNIVERSAL DETACHABLE TRAY

Constantine W. Baron, Oakland, N. J.

Application February 19, 1949, Serial No. 77,425

1 Claim. (Cl. 224—32)

This invention relates to a detachable bicycle carrier, tray or the like.

It is an object of the present invention to provide a bicycle carrier, tray or the like which can be easily attached to a support without the necessity of removing a clamp or the like each time the carrier or tray is removed, and wherein the supporting brackets may remain upon the support in place to receive the attaching extensions or portions of the carrier or tray.

Other objects of the present invention are to provide a removable bicycle carrier, tray or the like which is of simple construction, inexpensive to manufacture, easy to install upon a support, quickly detachable, sturdy and of rugged construction, convenient to use and efficient in operation.

For other objects and for a better understanding of the invention, reference may be had to the following detailed description taken in connection with the accompanying drawing, in which Fig. 1 is a perspective view of the carrier removed from its support.

Fig. 2 is a collective view of the mounting bracket for the support.

Fig. 3 is a side elevational view of the carrier and the brackets and the support.

Referring now to the figures, 10 represents the main part of the carrier which comprises a U-shaped member or frame having inwardly bent ends 11 and 12 with depending attaching elements 13 and 14 respectively pivotally connected thereto as indicated at 15. These attaching depending portions are adapted to fit in vertically extending openings 16 on a split sleeve 17 having flanges 18 through which bolts 19 may be extended to cause the sleeve to be clamped or fixed upon a support rod 21. A nut 22 fits the screw bolt 19.

Pivotally connected to the rear end of the main part 10 of the carrier and respectively at the opposite sides thereof are downwardly and forwardly extending converging braces 23 and 24 having bent ends 25 respectively which are adapted to fit a second clamp 17 which is connected to another portion of the supporting rod or post 21. These bent ends 25 can be fitted into the openings 16 of the clamp 17. The braces 23 and 24 are respectively pivotally connected, as indicated at 26, to the main frame 10.

To mount the carrier in place on the support 21, the brackets 23 and 24 may first be inserted in the lower clamp 17 and thereafter upon hinging upwardly the main part, the depending attaching and pivotally connected portions 13 and 14 can be dropped into openings 16 on the upper bracket 17. The carrier can be as easily removed in the reverse manner or by first removing the brackets 23 and 24 and thereafter removing the top frame.

While various changes may be made in the detail construction, it shall be understood that such changes shall be within the spirit and scope of the present invention as defined by the appended claim.

Having thus set forth and disclosed the nature of my invention, what is claimed is:

A bicycle carrier, tray or the like adapted to be releasably secured to a support comprising a main horizontally extending part having inwardly bent ends, vertically extending attaching portions pivotally connected to the inwardly bent ends and adapted to be fitted into openings of a support, and brace members pivotally connected to the frame and having portions adapted to extend into openings of a support, and sleeve brackets having openings on the opposite sides of the same and adapted to be clamped to a support to receive the depending portions of the main frame and the ends of the braces.

CONSTANTINE W. BARON.

REFERENCES CITED

The following references are of record in the file of this patent:

FOREIGN PATENTS

| Number | Country | Date |
|---|---|---|
| 4,339 | Great Britain | Mar. 1, 1901 |
| 7,581 | Great Britain | Mar. 30, 1907 |
| 20,949 | Great Britain | Nov. 20, 1900 |